United States Patent
Maru et al.

(10) Patent No.: US 6,589,456 B1
(45) Date of Patent: Jul. 8, 2003

(54) METHOD AND APPARATUS FOR COMPENSATING MOLD THICKNESS CHANGES IN TOGGLE TYPE CLAMPING UNIT FOR INJECTION MOLDING MACHINE

(75) Inventors: Tatsuhiko Maru, Numazu (JP); Jun Koike, Shizuoka-Ken (JP); Toshihiro Kasai, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 219 days.

(21) Appl. No.: 09/698,171

(22) Filed: Oct. 30, 2000

(30) Foreign Application Priority Data

Oct. 29, 1999 (JP) .......................................... 11-309898

(51) Int. Cl.⁷ .............................................. B29C 45/66
(52) U.S. Cl. .................. 264/40.5; 264/328.1; 425/150; 425/593
(58) Field of Search ............................ 264/40.5, 328.1; 425/150, 451.5, 451.6, 592, 593

(56) References Cited

U.S. PATENT DOCUMENTS

| | | | | |
|---|---|---|---|---|
| 4,281,977 A | * | 8/1981 | Farrell ........................ | 264/40.5 |
| 4,726,920 A | * | 2/1988 | Yokota ....................... | 264/328.1 |
| 4,849,678 A | * | 7/1989 | Kamiguchi et al. ........ | 264/40.1 |
| 4,950,144 A | * | 8/1990 | Watanabe et al. .......... | 264/328.11 |
| 5,045,253 A | * | 9/1991 | Kamiguchi et al. ........ | 264/328.1 |
| 5,059,365 A | * | 10/1991 | Hertzer et al. ............. | 264/40.5 |
| 5,149,471 A | * | 9/1992 | Catanzaro et al. ......... | 264/328.1 |
| 6,157,158 A | * | 12/2000 | Ishikawa ................... | 264/40.5 |
| 6,402,998 B1 | * | 6/2002 | Onishi ....................... | 264/40.5 |
| 6,419,861 B1 | * | 7/2002 | Stirn et al. ................ | 264/328.1 |

* cited by examiner

Primary Examiner—Jill L. Heitbrink
(74) Attorney, Agent, or Firm—Pillsbury Winthrop LLP

(57) ABSTRACT

An mold thickness adjustable range S of a link housing included in a toggle type clamping unit for a thick mold of the greatest allowable thickness and that of the same for a thin mold of the smallest allowable thickness is divided into a plurality of sections. Extra elongations by which tie bars included in the toggle type mold clamping system are to be stretched for desired mold clamping forces are determined beforehand and are assigned to the sections of the mold thickness adjustable range S. One of the sections in which the link housing is positioned when the toggle type mold clamping system is set in a lock-up state in which a movable half mold is in contact with a fixed half mold is specified by a combination of binary signals provided by switches. The spacing between a movable platen holding the movable half mold and a fixed platen holding the fixed half mold is adjusted by adjusting the position of the link housing so that the tie bars are stretched by the extra elongation for a desired mold clamping force when the movable and the fixed half mold are clamped.

5 Claims, 5 Drawing Sheets

| SECTION \ CLAMPING FORCE | $F_1$ | $F_2$ | $F_3$ | ... |
|---|---|---|---|---|
| SECTION 1 | $x_{11}$ | $x_{12}$ | $x_{13}$ | ... |
| SECTION 2 | $x_{21}$ | $x_{22}$ | $x_{23}$ | ... |
| SECTION 3 | $x_{31}$ | $x_{32}$ | $x_{33}$ | ... |
| SECTION 4 | $x_{41}$ | $x_{42}$ | $x_{43}$ | ... |

FIG.3

THICK MOLD

THIN MOLD

METHOD AND APPARATUS FOR COMPENSATING MOLD THICKNESS CHANGES IN TOGGLE TYPE CLAMPING UNIT FOR INJECTION MOLDING MACHINE

BACKGROUND OF THE INVENTION

1. Field of the Invention

The present invention relates to a method of and a apparatus for compensating mold thickness changes in a toggle type clamping unit included in an injection molding machine and, more particularly, to a method of and a apparatus which enable to compensate mold thickness changes according to the thickness of a mold without requiring the accurate measurement of the position of a link housing included in the toggle type clamping unit

2. Description of the Related Art

Referring to FIG. 5, a toggle type mold clamping system for an injection molding machine has a fixed platen 2 and a movable platen 3. A mold includes a fixed half mold 4a fastened to the fixed platen 2 and a movable half mold 4b fastened to the movable platen 3. The fixed platen 2 is joined to one end of four tie bars 5. The movable platen 3 is supported on the tie bars 5 for forward and backward sliding movement on a base 6. FIG. 5(a) shows the toggle type clamping unit in a state where the mold 4a and 4b of a great thickness are clamped between the fixed platen 2 and the movable platen 3. FIG. 5(b) shows the toggle type clamping unit in a state where the mold 4a and 4b of a small thickness are clamped between the fixed platen 2 and the movable platen 3.

A toggle link mechanism includes a link housing 7, toggle links 8 interconnecting the link housing 7 and the movable platen 3, a cross head 9 and a servomotor 10. Tie bar nuts 11 are mounted on end portions of the tie bars 5 contiguous with the outer sides of the fixed platen 2 and the link housing 7. When the cross head 9 is driven for forward movement by the servomotor 10, the toggle links 8 are turned so as to advance the movable platen 3 for a mold closing operation.

The toggle clamping unit is able to produce a very high mold clamping force when the toggle links 8 are extended straight Therefore, when the fixed half mold 4a and the movable half mold 4b are completely joined together immediately before the toggle links 8 are extended straight and the tie bars 5 are stretched by a tensile load when the toggle links 8 are extended straight, the mold can be clamped by a very high elastic force produced by the tie bars 5 bearing the tensile load.

The mold clamping force F (tf) of the toggle clamping unit is expressed by:

$$F = (\Delta L \cdot A \cdot E / 1000 \cdot L$$

where ($\Delta L$ is the elongation (cm) of the tie bars, A is the sectional area (cm$^2$) is the sectional area of the tie bars, E is the modulus of direct elasticity (kgf/cm$^2$) of the tie bars, and L is the distance (cm) between the opposite surfaces of the nuts on each tie bar.

When the mold is replaced with another mold having a thickness different from that of the former, the distance L changes and, consequently, mold clamping force changes greatly. Therefore, the elongation ($\Delta L$ (hereinafter referred to as extra elongation) of the tie bars 5 must be adjusted.

Various systems for compensating for mold thickness changes by adjusting the extra elongation in the toggle type clamping unit are known. For example, a system disclosed in JP-A No. 1989-158521 includes a measuring means including an encoder that measures the thickness of a closed mold (i.e., the distance between the respective working surfaces of a fixed plate and a movable plate), and a calculating means for calculating a correction necessary to be added to an extra elongation to produce a fixed mold clamping force on the basis of the measured distance measured by the measuring means, and drives a toggle type clamping mechanism for movement according to the calculated correction.

A method of compensating for mold thickness changes in a toggle type clamping unit disclosed in Japanese Patent No. 2709868 includes a linear scale for measuring the longitudinal displacement of a rear platen corresponding to the link housing 7 shown in FIG. 5, and measures the distance between nuts on each of tie bars, and a displacement of the rear platen indicated on the linear scale when a reference mold having a movable half mold fastened to a movable platen and a fixed half mold fastened to a fixed platen are locked up. Then, the method measures a displacement of the rear platen indicated on the linear scale when another mold is locked up between the movable platen and the fixed platen. The method calculates an extra elongation and an effective length of the tie bars necessary to clamp the mold by a desired mold clamping force on the basis of the measured values, and sets the movable platen at a position corresponding to the effective length of the tie bars.

The prior art system and method must determine a datum point, thereby determining the positional relation between the fixed platen, the movable platen and the link housing accurately, and hence needs expensive measuring means capable of accurate determination of positions.

In mold clamping force adjustment, a very slight error in the determination of a position results in a great change in mold clamping force. On the other hand, mold clamping force is dependent on external factors including the characteristic of the toggle linkage, the rigidity of the mold, thermal expansion and thermal contraction. Accordingly, the adjustment of the initial condition of the toggle type clamping unit takes much time and cannot be accurately achieved because the initial condition of the toggle type mold clamping system is dependent on various conditions.

Accordingly, it is an object of the present invention to provide a method of and apparatus for compensating for mold thickness changes by adjusting initial platen spacing in a toggle type clamping unit included in an injection molding machine, capable of making the toggle type mold clamping system exerts an appropriate mold clamping force stably on a mold without requiring the accurate measurement of the positional relation between a fixed platen, a movable platen and a link housing included in the injection molding machine.

SUMMARY OF THE INVENTION

According to a first aspect of the present invention, a method of compensating for mold changes in a toggle type motor-driven clamping unit having a link housing, a movable platen with a movable mold, a fixed platen with a fixed mold, a toggle link mechanism interconnecting the link housing and the movable platen, and tie bars supporting the link housing, said method comprises steps of dividing a mold thickness adjustable range between a position of the link housing for a thick mold of the greatest allowable thickness and that of the same for a thin mold of the smallest allowable thickness into a plurality of sections; assigning extra elongations of the tie bar applied by the toggle link mechanism for desired mold clamping forces to each of the sections of the platen thickness adjustable range;

moving the link housing forward in a state where the toggle link mechanism is locked up; detecting that which sections the link housing is located in when the movable mold contacts with the fixed mold, and; adjusting the position of the link housing so that the tie bars are elongated by the extra elongation for a desired mold clamping force, assigned to the section in which the link housing is positioned.

According to a second aspect of the present invention, apparatus for compensating for mold changes in a toggle type motordriven clamping unit having a link housing, a movable platen with a movable mold, a fixed platen with a fixed mold, a toggle link mechanism interconnecting the link housing and the movable platen, and tie bars supporting the link housing, said apparatus comprises a plurality of switches that provide binary signals specifying a plurality of divisional sections of a mold thickness adjustable range between a position of the link housing for a thick mold of the greatest allowable thickness and that of the same for a thin mold of the smallest allowable thickness; a dog attached to the link housing and capable of operating on-off action with different combinations of the switches in relative to each of the sections of the mold thickness adjustable range, respectively; a section specifying means capable of specifying one of the sections of the mold thickness adjustable range in which the link housing is positioned on the basis of a combination of the binary signals provided by the switches; a storage means storing data table including extra elongations of the tie bar applied by the toggle link mechanism for desired mold clamping forces and assigned to the sections of the mold thickness adjustable range; an adjusting mechanism including adjusting nuts screwed on threaded end portions of tie bars and an adjusting motor for rotating the adjusting nuts to move the link housing; and a control means capable of reading an extra elongation for a desired mold clamping force assigned to the section in which the link housing is positioned from the data table and controlling the adjusting motor to adjust the position of the link housing so that the tie bars may be stretched by the extra elongation read from the data table.

BRIEF DESCRIPTION OF THE DRAWINGS

The above and other objects, features and advantages of the present invention will become more apparent from the following description taken in connection with the accompanying drawings: in which:

FIG. 3 is a data table including extra elongation determined beforehand through experiments and assigned to sections of an platen thickness adjustable range;

FIG. 5A is a side elevation of a conventional toggle type mold clamping unit with thick molds; and.

DESCRIPTION OF THE PREFERRED EMBODIMENTS

Figure 1:
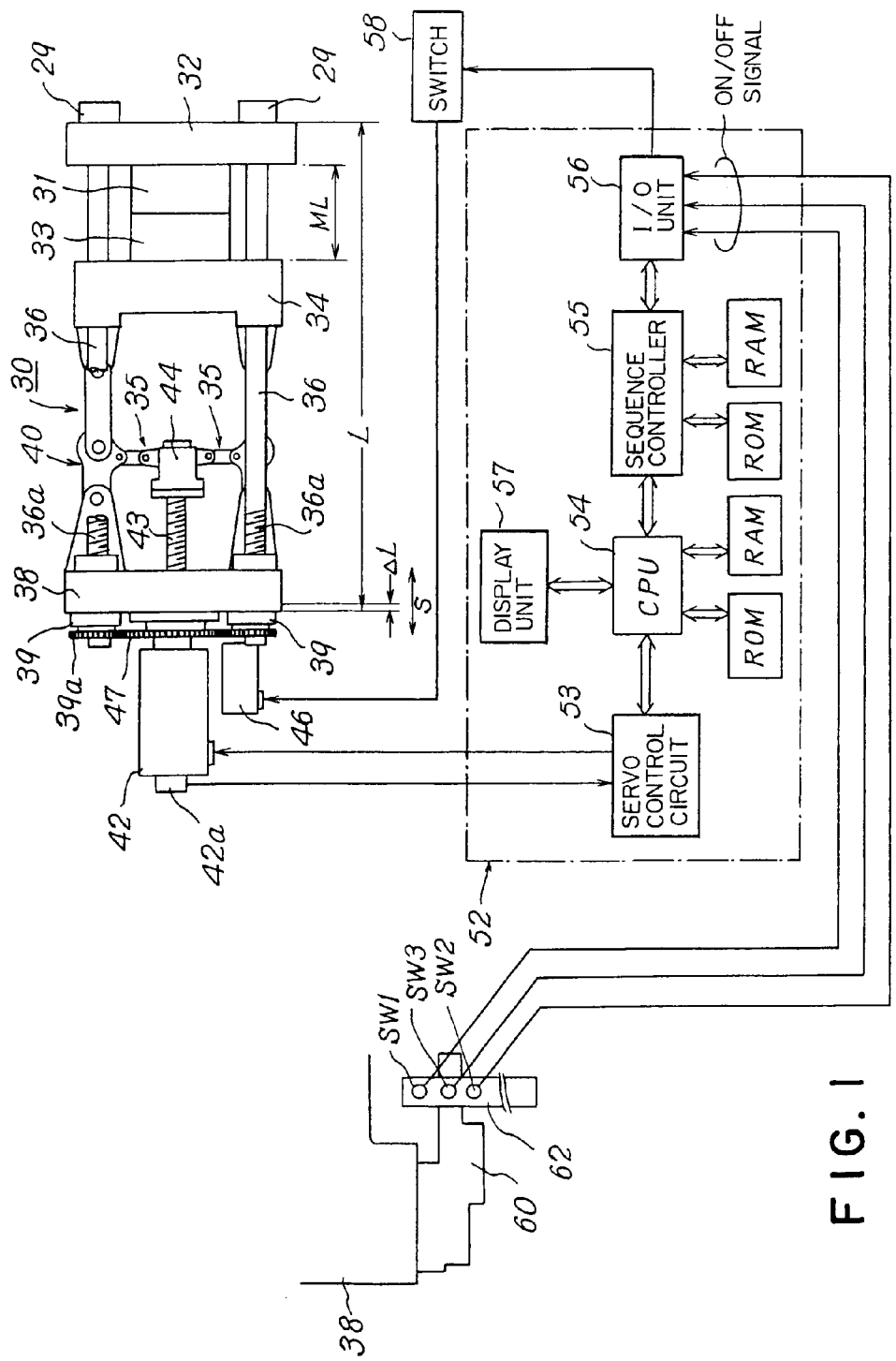
FIG. 1 is a block diagram showing a preferred embodiment according to the present invention.

Referring to FIG. 1 showing a toggle type clamping unit 30, a fixed half mold 31 is fastened to a fixed platen 32 and a movable half mold 33 is fastened to a movable platen 34. The fixed platen 32 is fastened to one end portion of each of four tie bars 36 (only two of those are shown in FIG. 1) with a tie bar nut 29. A threaded portion 36a is formed in the other end portion of each of the tie bars 36. The threaded portions 36a of the tie bars 36 are passed through holes formed in the four corners of a link housing 38. Platen spacing adjusting nuts 39 are screwed on the threaded portions 36a on the side of the back surface of the link housing 38. The platen spacing adjusting nuts 39 can be turned in opposite directions to move the link housing 38 forward and backward relative to the tie bars 36 for adjusting initial platen spacing ML.

The link housing 38 and the movable platen 34 are connected by a double-linkage type toggle link mechanism 40 having toggle links 35. The toggle link mechanism 40 is provided with a ball screw 43 to be driven for rotation by a clamping servomotor 42. The ball screw 43 is screwed in a cross head 44 to which the toggle links 35 are pivotally joined. The ball screw 43 and the cross head 44 form a ball screw mechanism. The ball screw 43 is driven by the clamping servomotor 42 for rotation in opposite directions to move the cross head 44 forward to close together the fixed half mold 31 and the movable half mold 33 and backward to open the movable half mold 33 from the fixed half mold 31. A rotary encoder 42a for position determination is combined with the clamping servomotor 42.

The platen spacing adjusting nuts 39 are turned to move the link housing 38 along the tie bars 36 by an adjusting nut driving mechanism including an platen spacing adjusting motor 46, and a gear train for transmitting the rotating power of the adjusting motor 46 to the adjusting nuts 39. The gear train includes gears 39a combined with the adjusting nuts 39, intermediate gears 47 engaged with the gears 39a, and a drive gear, not shown, mounted on the output shaft of the platen spacing adjusting motor 46 and engaged with the intermediate gears 47. The adjusting nuts 39 can be driven for simultaneous rotation by the platen spacing adjusting motor 46.

A controller 52 controls a mold clamping operation and a compensation for mold thickness changes. The controller 52 includes a servo control circuit 53, a CPU 54, a sequencer CPU 55 for controlling the adjusting motor 46, an I/O unit 56, and a display unit 57 for setting parameters necessary for adjustment and displaying the set parameters. ROMs and RAMs storing data necessary for mold thickness adjustment are connected to the CPUs 54 and 55. Indicated at 58 is a switch for connecting the adjusting motor 46 to and disconnecting the same from a power source.

According to the present invention, the position of the link housing 38 is determined by the combined actions of a dog 60 and proximity switches SW1, SW2 and SW3. The dog 60 is fixed to the link housing 38 for movement together with the link housing 38. The proximity switches SW1, SW2 and SW3 are held in a line of vertical arrangement on a bracket 62 fixed to a base.

In FIG. 1, indicated at S is a mold thickness adjustable range between a position of the link housing 38 when a mold of the smallest allowable thickness is used and a position of the link housing 38 when a mold of the greatest allowable thickness is used. The position of the link housing 38 in the mold thickness adjustable range S is depend on a thickness of the mold to be used. The mold thickness adjustable range S is divided into a plurality of sections, and different combinations of on- and off-states of the proximity switches SW1, SW2 and SW3 are assigned to the plurality of sections, respectively.

Since the three proximity switches SW1, SW2 and SW3 are used, eight ($2^3$=8) combinations of binary values *0* and *1* respectively corresponding to the on-state and the off-state of the proximity switches SW1, SW2 and SW3 are available.

Figure 2:
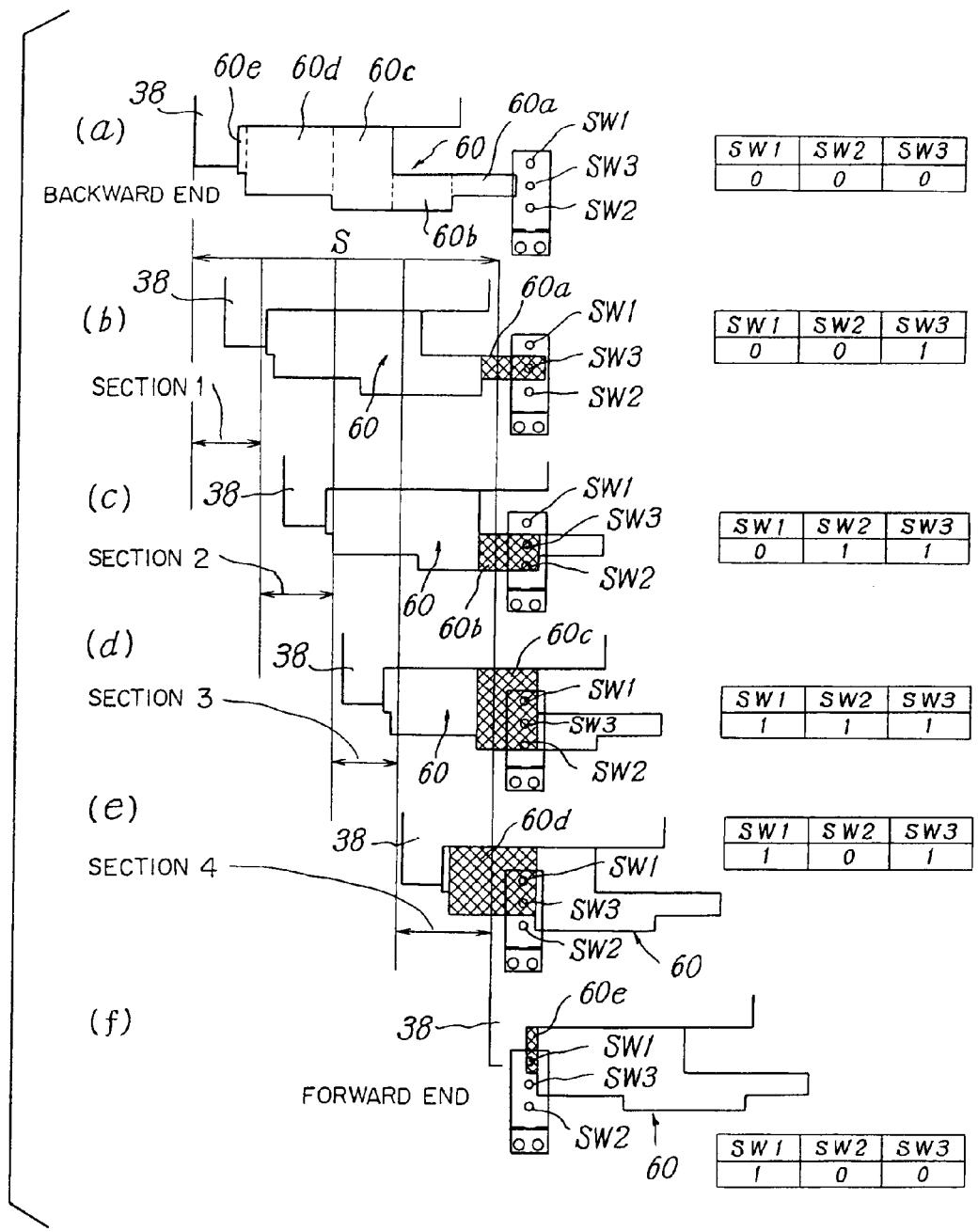
FIG. 2 is a diagrammatic view of assistance in explaining the positional relation between a dog and proximity switches and the condition of the proximity switches.

In this embodiment, the mold thickness adjustable range S is divided into four sections, i.e., sections 1 to 4, and the four combinations of the binary values are used to indicate the position of the link housing 38 as shown in FIG. 2. The link housing 38 is at the back end of the mold thickness adjustable range S in FIG. 2(a) and is at a front end of the mold thickness adjustable range S in FIG. 2(f). The sections 1 to 4 of the mold thickness adjustable range S are arranged in that order from the back end of toward the front end thereof.

The dog 60 is a metal plate having rectangular portions 60a to 60d of different shapes. When the link housing 38 is at the back end of the mold thickness adjustable range S, the dog 60 turns off all the proximity switches SW1 to SW3 as shown in FIG. 2(a). The rectangular portion 60a of the dog 60 has a width to turn on the proximity switch SW3 exclusively. The rectangular portion 60b of the dog 60 has a width to turn on the proximity switches both of SW2 and SW3 as shown in FIG. 2(c). Similarly, the rectangular portions 60c, 60d and 60e of the dog 60 have a width to turn on the proximity switches SW1, SW2 and SW3 as shown in FIG. 2(d), a width to turn on the proximity switches SW1 and SW3 as shown in FIG. 2(e) and a width to turn on the proximity switch SW1 as shown in FIG. 2(f), respectively. Thus, the section of the mold thickness adjustable range S in which the link housing 38 is positioned during adjustment procedure can be specified by a binary data represented by a combination of the output signals of the proximity switches SW1, SW2 and SW3.

FIG. 3 shows a data table stored in the RAM of the controller 52. Extra elongations xij necessary for producing different mold clamping forces F1, F2 and F3 for the four sections of the mold thickness adjustable range S are determined beforehand through experiments. Thus, a necessary elongation xij can be determined from a section in which the link housing 38 is positioned and a necessary mold clamping force.

Figure 4:
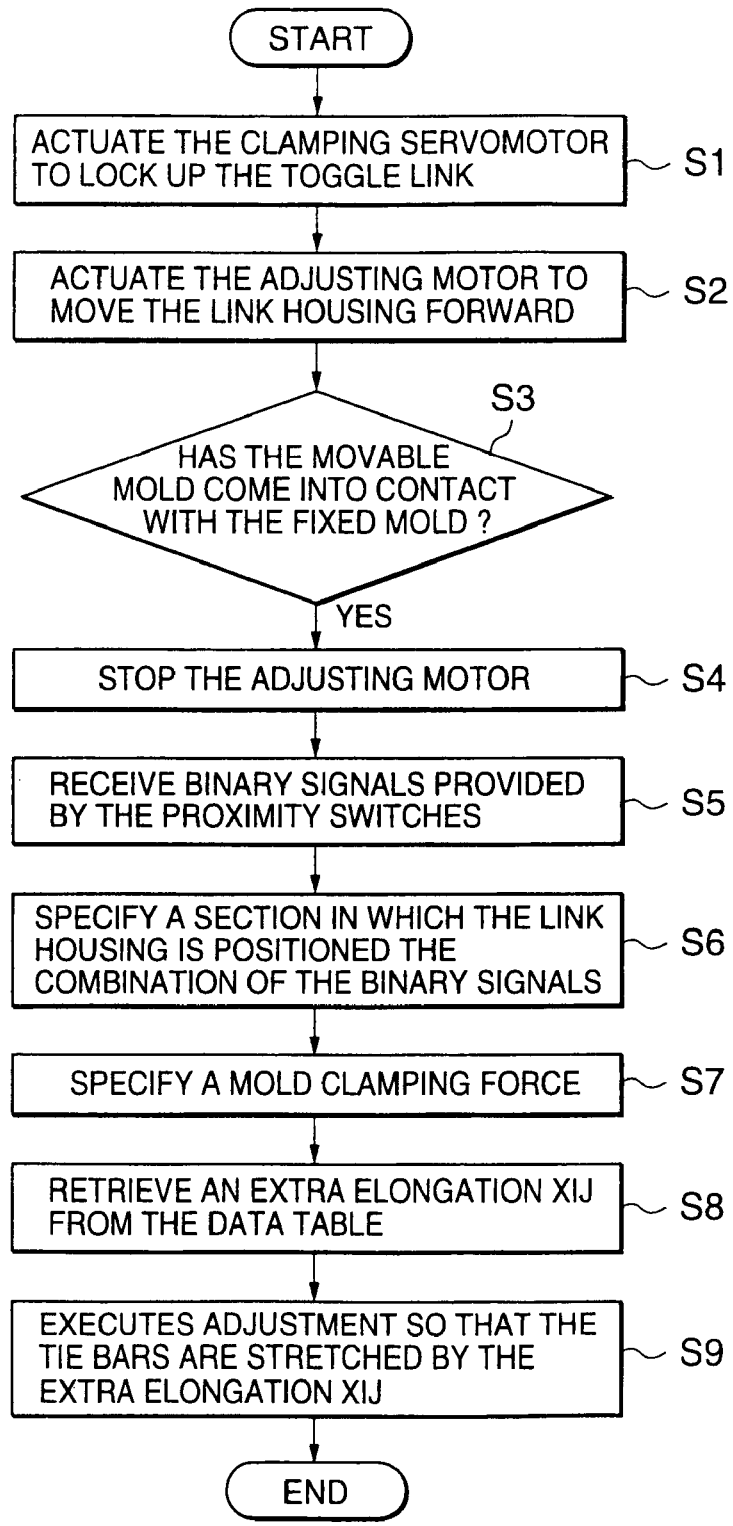
FIG. 4 is a flow chart of a method of compensating for mold thickness changes according to the present invention.
Figure 5A:
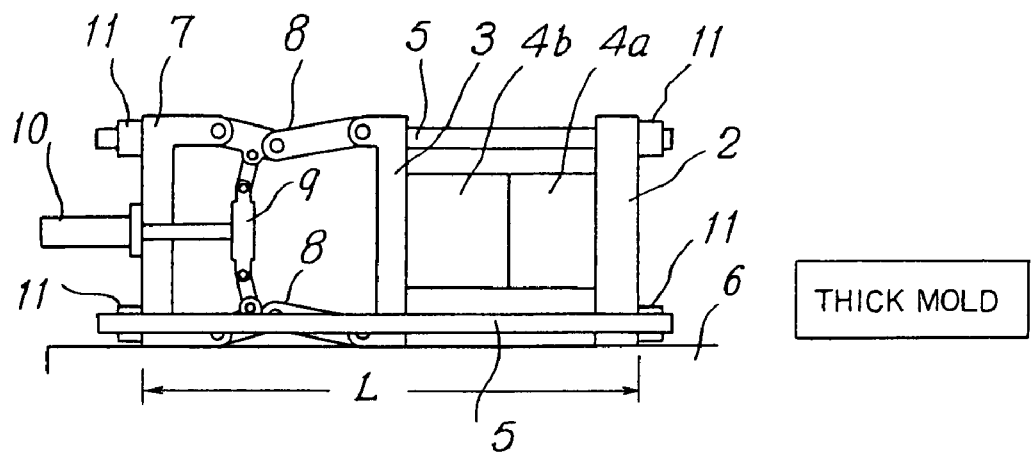
Figure 5B:
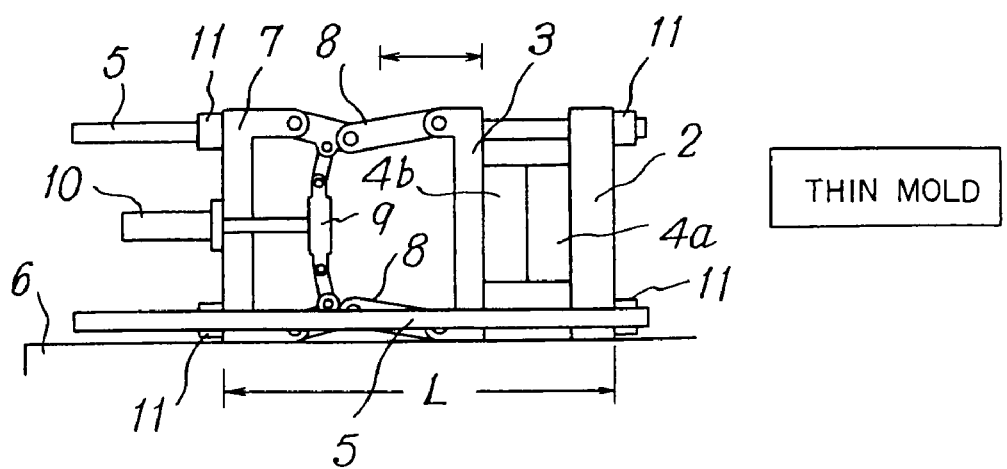
FIG. 5B is a side elevation of a conventional toggle type mold clamping unit with thin molds.

An compensation procedure after a mold is changed will be described with reference to a flow chart shown in FIG. 4.

After changing molds, the toggle link mechanism 40 is opened and the link housing 38 is positioned at the back end of the mold thickness adjustable range S.

In step S1, the clamping servomotor 42 is actuated to move the cross head 44 forward so that the toggle link mechanism 40 stretches in a lock-up state. Then, in step S2, the platen spacing adjusting motor 46 is actuated to rotate the adjusting nuts 39 so that the link housing 38 is moved forward Consequently, the movable half mold 33 approaches the fixed half mold 31. Upon the contact of the movable half mold 33 with the fixed half mold 31, i.e., closing of the mold, and the response in step S3 is affirmative, the platen spacing adjusting motor 46 is stopped in step S4. The sequencer CPU 55 receives output signals provided by the proximity switches SW1 to SW3 through the I/O unit 56 and identifies the section of the mold thickness adjustable range S in which the link housing 38 is positioned For example, if the output signals provided by the proximity switches SW1, SW2 and SW3 are *0*, *0* and *1*, respectively, the sequencer CPU 55 decides that the link housing 38 is in the section 2 in steps S5 and S6.

In step S7, the display unit 57 is operated to set a mold clamping force necessary for molding using the molds consisting of the half molds 31 and 33. The sequencer CPU 55 searches the data table stored in the RAM for a mold clamping force corresponding to the set mold clamping force and the identified section of the mold thickness adjustable range S in which the link housing 38 is positioned. Suppose that the necessary mold clamping force is F3 and the link housing 38 is positioned in the section 1, an extra elongation x13 is selected in step S8. Then, the following compensating procedure to extend the tie bars 36 by the extra elongation x13 is executed.

At this stage, the toggle links 35 are at positions corresponding to a locked-up state and the movable half mold 33 is joined to the fixed half mold 31 as shown in FIG. 1. In this state, any effective stretching load is not applied on the tie bars 36 and the tie bars 36 are not substantially stretched. Then, the clamping motor 42 is actuated to move the movable half mold 33 away from the fixed half mold 31 by a distance corresponding to the extra elongation x13 so that a gap of a width corresponding to the extra elongation x13 is formed between the fixed half mold 31 and the movable half mold 33. Subsequently, the platen spacing adjusting motor 46 is actuated to advance the link housing 38 until the movable half mold 33 comes into contact with the fixed half mold 31. Thus, the adjustment of the extra elongation (L for the mold is completed.

Since the section in which the link housing 38 is positioned can be known from the combinations of the binary signals provided by the proximity switches and the extra elongation corresponding to the desired mold clamping force and the extra elongation can be retrieved from the data table, datum point does not need to be determined and the accurate measurement of the positional relation between the movable platen 34 and the link housing 38 using an expensive measuring means is unnecessary and the mold thickness adjustable to set a desired mold clamping force can be automatically carried out.

Although the foregoing embodiment uses the three proximity switches and divides the mold thickness adjustable range S into the four sections, the position of the link housing does not need to be measured continuously and precisely because the mold clamping force is dependent on the characteristic of the toggle link mechanism of the toggle type mold clamping system. When necessary, the number of the sections of the mold thickness adjustable range S may be increased for the more accurate determination of the position of the link housing, and the number of the sections of the mold thickness adjustable range and steps of the mold clamping forces in the data table may be increased for the more precise adjustment. For example, the mold thickness adjusting range can be divided into an increased number of sections when four or five proximity switches are used, because $16=2^4$ combinations of the binary output signals of the proximity switches are available when the number of the proximity switches is four or $32=2^5$ combinations of the binary output signals of the proximity switches are available when the number of the proximity switches is five. Limit switches may be used instead of the proximity switches.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A method of compensating for mold changes in a toggle motor-driven clamping unit having a link housing, a movable platen with a movable mold, a fixed platen with a fixed mold, a toggle link mechanism interconnecting the link housing and the movable platen, and tie bars supporting the link housing, said method comprising:

providing a combination of dogs and switches producing a combination of ON and OFF binary signals;

dividing a mold thickness adjustable range between a position of the link housing for a thick mold of the greatest allowable thickness and a position of the link housing for a thin mold of the smallest allowable thickness into a plurality of sections, so that the number of divisional sections of the mold thickness adjustable range is within the number of the combination of the ON and OFF binary signals;

determining the relationship of the position of the link housing when the movable mold contacts with the fixed mold to the any of the divisional sections of the mold thickness adjustable range;

assigning extra elongations of the tie bar applied by the toggle link mechanism for desired mold clamping forces to each of the sections of the mold thickness adjustable range;

moving the link housing forward in a state where the toggle link mechanism is locked up;

detecting which sections the link housing is positioned in when the movable mold contacts with the fixed mold on the basis of the combination of ON and OFF binary signals provided by the switches, and;

adjusting the position of the link housing so that the tie bars are elongated by the extra elongation for a desired mold clamping force, assigned to the section in which the link housing is positioned.

2. The method according to claim 1, wherein the position of the link housing is detected by:

moving the movable mold away from the fixed mold by a distance corresponding to the extra elongation so that a gap of a width corresponding to the extra elongation is formed between the fixed mold and the movable half mold;

advancing the link housing until the movable mold comes into contact with the fixed mold.

3. An apparatus for compensating for mold changes in a toggle motor-driven clamping unit having a link housing, a movable platen with a movable mold, a fixed platen with a fixed mold, a toggle link mechanism interconnecting the link housing and the movable platen, and tie bars supporting the link housing, said apparatus comprising:

a plurality of switches that provide binary signals specifying a plurality of divisional sections of a mold thickness adjustable range between a position of the link housing for a thick mold of the greatest allowable thickness and a position of the link housing for a thin mold of the smallest allowable thickness;

a dog attached to the link housing and capable of operating on-off action with different combinations of the switches relative to each of the sections of the mold thickness adjustable range, respectively;

a section specifying means capable of specifying one of the sections of the mold thickness adjustable range in which the link housing is positioned on the basis of a combination of the binary signals provided by the switches;

a storage means for storing a data table including extra elongations of the tie bar applied by the toggle link mechanism for desired mold clamping forces and assigned to the sections of the mold thickness adjustable range;

an adjusting mechanism including adjusting nuts screwed on threaded end portions of tie bars and an adjusting motor for rotating the adjusting nuts to move the link housing; and a control means capable of reading an extra elongation for a desired mold clamping force assigned to the section in which the link housing is positioned from the data table and controlling the adjusting motor to adjust the position of the link housing so that the tie bars may be stretched by the extra elongation read from the data table.

4. The apparatus according to claim 3, wherein the dog is made of a metal plate having a combination of rectangular portions of different shapes, and the switches are proximity switches held in a line of vertical arrangement relative to the moving direction of the link housing.

5. The apparatus according to claim 4, wherein the each rectangular portions of the dog has a width to turn on the specified proximity switch exclusively when passing above the line of the proximity switches.

* * * * *